May 2, 1944. R. G. AREY 2,348,006
ELECTRIC MEASURING INSTRUMENT
Filed Dec. 11, 1942
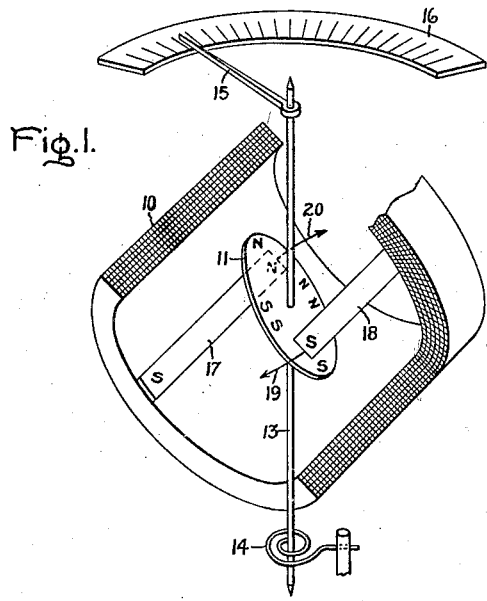
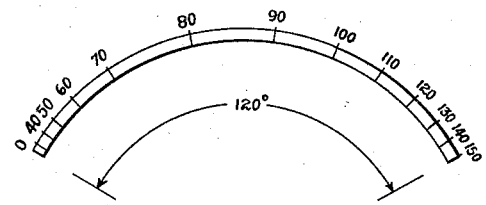
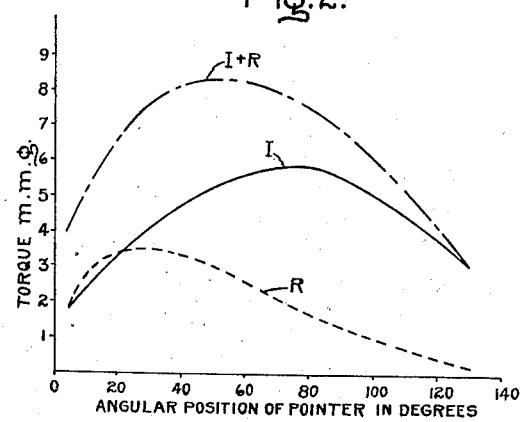
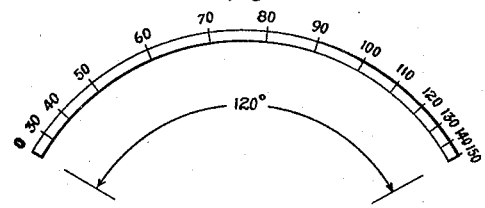
Inventor:
Ralph G. Arey,
by Harry E. Dunham
His Attorney.

Patented May 2, 1944

2,348,006

UNITED STATES PATENT OFFICE 2,348,006

ELECTRIC MEASURING INSTRUMENT

Ralph G. Arey, Swampscott, Mass., assignor to General Electric Company, a corporation of New York Application December 11, 1942, Serial No. 468,673

4 Claims. (Cl. 171—95)

My invention relates to electrical measuring instruments and its object is to provide electrical measuring instruments of rugged construction having high sensitivity and efficiency and improved scale distribution.

In carrying my invention into effect I combine in a single instrument, measurement principles which have heretofore been used separately in different instruments. In particular I combine the actuating principles of both the inclined coil and repulsion instruments in a single device.

The features of my invention which are believed to be novel and patentable will be pointed out in the claims appended hereto. For a better understanding of my invention reference is made in the following description to the accompanying drawing in which Fig. 1 represents a part sectional view of a single vane inclined coil repulsion instrument embodying my invention. Fig. 2 shows by way of curves the relation of the different torques involved, Fig. 3 represents a scale distribution for an inclined vane instrument and Fig. 4 the scale distribution for an inclined vane repulsion instrument.

Referring now to Fig. 1, 10 represents the inclined exciting coil and 11 the magnetic vane of an inclined coil electrical measuring instrument. The vane is mounted on a rotatable non-magnetic shaft 13 and inclined thereto as shown. A spring 14 provides the zero restoring torque and a pointer 15 cooperating with a scale 16 indicates the deflection. As thus far described the instrument is essentially similar to prior art inclined coil instruments. The inclined torque is produced by the tendency of the vane to rotate from a position nearly crosswise of the coil to a position nearly lengthwise of the coil. Fig. 1 represents the instrument in a low scale indicating position where the vane is more nearly crosswise of the coil. When the coil is energized, the shaft will rotate clockwise to allow the vane to more nearly line up with the flux axis of the coil. This torque is resisted by the spring 14 and hence the deflection is proportional to the excitation of the coil. The torque which is due to the inclined coil and vane principle varies in value for different angular deflections generally in a manner represented by the curve I, Fig. 2, where torque is plotted against angular deflection in degrees and such inclination torque produces a scale distribution of the character represented in Fig. 3, the end portions of which are crowded particularly the lower end.

The present invention relates to an addition to the general type of instrument thus far described of a fixed iron member or members which are so positioned with respect to the moving vane and polarized by the coil flux as to produce an additional torque, in the example given a repulsion torque, in the same direction as the inclination torque.

Such addition not only improves the scale distribution but increases the sensitivity and efficiency of the instrument in a very remarkable and unexpected degree.

Two fixed repulsion irons 17 and 18 are provided in Fig. 1. Repulsion iron 17 is placed axially of the coil on the inner far side and toward the lower end thereof so as to extend between the lower end of the coil to a position adjacent but not touching the back upper edge of the vane 11 when in the position represented. Fixed repulsion iron 18 extends from the upper end of the coil on the inner near side axially to a position adjacent the lower near edge of the vane 11 when in the position represented.

As thus arranged it is evident that excitation of the coil will polarize the fixed irons and moving vane to cause repulsion between the adjacent parts of 11 and 18 and the adjacent parts of 11 and 17. Thus at a given instant the lower end or iron 18 and the lower edge of vane 11 which is adjacent the lower end of iron 18 will be polarized south. At this time the adjacent upper parts of 17 and 11 will be polarized north. N and S polarization marks have been placed on such parts in Fig. 1 to indicate the condition just described. If the instrument is an alternating current instrument all of the polarity markings will reverse simultaneously and periodically. The instrument may be either A. C. or D. C.

It is now seen that there exists repulsion torques between the fixed irons and moving vane and their relative dispositions are such as to produce repulsion torques in the same clockwise direction as the inclination torque. Thus there is a repulsion torque between the adjacent surfaces of 11 and 18 which may be represented by arrow 19 and a repulsion torque between the adjacent surfaces of 17 and 11 which may be represented by arrow 20. In rotating clockwise vane 11 moves away from 18. Likewise vane 11 moves away from 17. As the vane rotates, the direction of flux through the vanes shifts somewhat with respect to the vane in a counterclockwise direction which keeps those parts of the vane which are closest to the repulsion poles of the fixed irons polarized for repulsion. Hence such repulsion torque is effective over a considerable part of the lower deflection range but decreases with upscale deflection as the vanes move farther away from the fixed irons. The nature of the repulsion torque with angular deflection is represented by curve R, Fig. 2. This torque, when combined with the inclination torque I, produces the summation torque curve I+R, and the improved scale distribution of Fig. 4.

The curves R of Fig. 2 were taken with an experimental instrument substantially as shown in Fig. 1 with the repulsion iron 17 removed. Hence the curves R and I+R of Fig. 2 do not represent the maximum torque improvement obtainable.

In obtaining curve I, Fig. 2, both irons 17 and 18 were removed and the instrument torque measured at different angular deflections with a constant current in the coil. Curve I+R was taken with the same current and with iron 18 in place. Curve R represents the difference of curves I+R and I. In such tests the return spring such as at 14, Fig. 1 was removed. However, the scale distributions shown in Figs. 3 and 4 were obtained using the usual return spring.

The shape of the vane, the angle of the vane with respect to the axis of shaft and coil, the length, shape, size and positioning of the fixed irons may be varied somewhat from the conditions shown. In experimenting to obtain the desired results it is advisable to have the fixed irons adjustable and when the desired position is found they may be cemented on or otherwise secured in place. The same principles are applicable to multiple vane instruments. In general the torque per watt input at the lower end of the scale may be increased about three times by the addition of the two repulsion fixed irons.

What I claim as new and desire to secure by Letters Patent of the United States, is:

1. An electrical measuring instrument of the inclined coil type having a stationary coil, a shaft and a magnetic vane on said shaft, said shaft being inclined to the axis of said coil and the vane being inclined with respect to the shaft, whereby an inclined coil type of instrument torque is produced, a magnetic member in fixed position within the coil and extending adjacent the path of movement of the magnetic vane, the adjacent parts of vane and fixed member being polarized by the flux of the coil to produce an additional instrument torque which is in the same direction as the inclined coil torque.

2. An electrical measuring instrument of the inclined coil type having a coil, a shaft and magnetic vane on the shaft within the coil, and means for producing a useful torque of repulsion in said instrument comprising a magnetic part fixed within the coil and polarized by the flux thereof to produce a magnetic pole adjacent the path of movement of the vane of the same polarity as that part of the vane which approaches closest thereto.

3. A combined inclined coil and repulsion type instrument comprising a usual form of inclined coil instrument, having a stationary energizing coil, a rotatable shaft and a magnetic vane on the shaft within the coil arranged to operate on the inclined coil principle, and stationary magnet means within the coil and polarized by the flux thereof for producing an up-scale magnetic repulsion torque on the vane over the down-scale portion of its range of movement.

4. A magnetic repulsion instrument comprising a rotatable shaft, magnetic vane means on said shaft, an energizing coil about said vane means and a fixed magnetic means within said coil, said two magnetic means comprising the movable and fixed magnetic repulsion member of said instrument, said coil, shaft and movable magnetic vane means having their axes inclined to each other so as to constitute an inclined coil type of instrument and producing an inclined coil torque in the same direction as the repulsion torque.

RALPH G. AREY.